Figure 1:
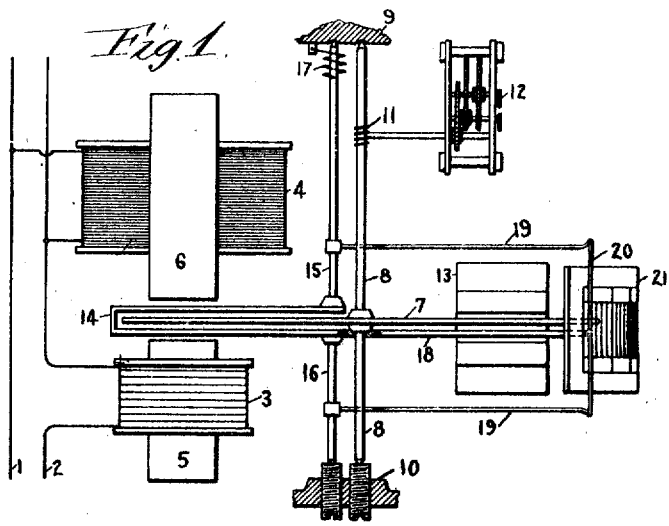

W. F. HOWE.
INDICATING AND RECORDING INSTRUMENT.
APPLICATION FILED SEPT. 17, 1907.

904,783.

Patented Nov. 24, 1908.

WITNESSES:
Irving E. Steers.
J. Ellis Glen

INVENTOR
WILLIAM F. HOWE.
BY
ATT'Y

UNITED STATES PATENT OFFICE.

WILLIAM F. HOWE, OF SCHENECTADY, NEW YORK, ASSIGNOR TO GENERAL ELECTRIC COMPANY, A CORPORATION OF NEW YORK.

INDICATING AND RECORDING INSTRUMENT.

No. 904,783.   Specification of Letters Patent.   Patented Nov. 24, 1908.

Application filed September 17, 1907. Serial No. 393,351.

*To all whom it may concern:*

Be it known that I, WILLIAM F. HOWE, a citizen of the United States, residing at Schenectady, county of Schenectady, State of New York, have invented certain new and useful Improvements in Indicating and Recording Instruments, of which the following is a specification.

My invention relates to measuring instruments and more particularly to recording instruments which also indicate the instantaneous values of the quantities recorded.

A common type of recording instrument or meter consists essentially of a small motor connected to a recording device for registering the revolutions of the motor. The motor is connected to the circuit to be metered and the speed of the motor is held within proper limits by any suitable device, usually a disk of conducting material mounted on the shaft of the motor to rotate between the poles of a damping magnet. An instrument of this type does not give any indication of the instantaneous values of the quantities measured by it, and in some instruments such an indication has been secured by utilizing the drag exerted by the rotating disk upon the damping magnet or upon a similar magnet mounted in proximity to the disk, but any error in the speed of the disk produces a corresponding error in the indication, while if the disk is stopped by friction or some obstruction, the indicating device becomes inoperative.

The object of my invention is to provide a recording or motor meter with an indicator for the instantaneous values of the quantities measured by it, which will be unaffected by errors in the speed of rotation of the armature of the meter, which is operative even though the armature of the meter is held stationary, and which is in general an improvement on devices of this kind heretofore used.

In carrying out my invention, a movable member or indicating armature is mounted in the field produced by the field coils of the meter so that any variation in the field caused by changes in the amount of current flowing through the meter will produce a corresponding change in the position of the indicating armature, which is provided with an index or pointer movable over a suitably graduated scale.

The movement of the indicating armature is restrained by a spring as is customary in indicating instruments and is damped in any suitable manner, preferably by extending the indicating armature into the field of the damping magnet.

The indicating armature may be mounted in any suitable relation to the field coils of the meter, but is preferably mounted to extend through the air gap between the field coils and the armature of the meter so that the effect of changes in the field on the indicating armature will be a maximum.

When used in connection with a meter having a disk armature, the indicating armature may have a U-shaped portion to embrace the disk, and a damping extension and pointer may be mounted on opposite sides of the pivots from the U-shaped portion so that the entire indicating system is balanced, thereby producing an exceedingly light moving system.

Figure 2:
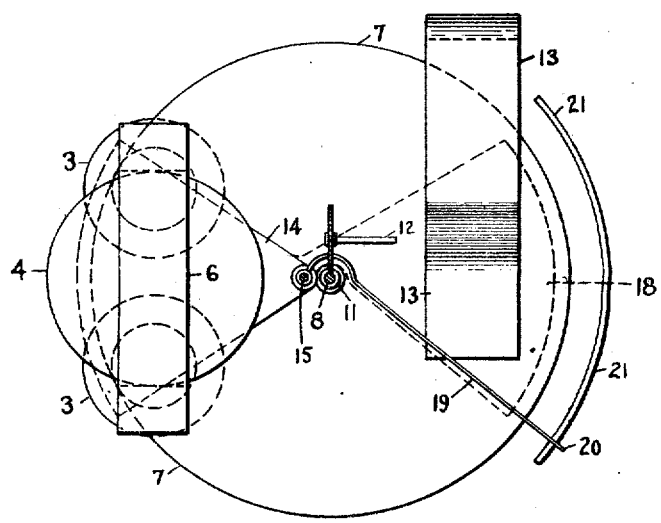

My invention will best be understood in connection with the accompanying drawings, which are merely an illustration of one embodiment of my invention, and in which Figure 1 is a side view showing a motor meter with a disk armature provided with an indicating attachment constructed in accordance with my invention; and Fig. 2 is a plan view of the instrument shown in Fig. 1.

In the particular embodiment of my invention shown in the drawings, which show an alternating current meter, the leads 1 and 2 of the alternating current circuit to be metered are connected to a current field coil 3 and a potential field coil 4, these coils being provided with yokes 5 and 6 forming pole pieces separated by an air gap in which the armature of the instrument moves.

The moving element of the meter comprises a rotatable disk armature 7 extending into the field of the coils 3 and 4 and mounted upon a shaft 8 which rotates in suitable bearings in the top 9 and bottom 10 of the meter frame. The shaft 8 is connected through a worm 11 with a recording or registering device 12 by means of which a record of the revolutions of the armature of the meter is obtained. The speed of rotation of the disk armature 7 is controlled by any suitable braking means, preferably a damping magnet 13 in the form of a U-shaped magnet with a pole on each side of the disk 7.

In order to secure an indication of the instantaneous values of the quantities measured, a movable conducting member or indicating armature is mounted in suitable relation to the field of the coils 3 and 4 so that variations in the field produced by said coils will cause a corresponding movement of the indicating armature. One arrangement which may be adopted, as shown in the drawings, consists of an indicating armature 14 made of sheet metal with a portion thereof U-shaped to embrace the disk 7, as shown in Fig. 1 of the drawing, and mounted on pivots 15 and 16 which engage bearings adjacent the bearings for the shaft 8. The indicating armature extends through the air gap between the yokes 5 and 6 and the disk armature 7 so that any change in the field will exert a maximum force on indicating armature 14. The movement of the indicating armature is resisted by a spiral spring 17 having one end connected to the pivot 15 and the other end to the top 9 of the meter frame.

In order to prevent violent or sudden fluctuation in the position of the indicating armature, some damping means should be provided, and a suitable arrangement, as shown in the drawings, consists in extending the armature 14 into the field of the damping magnet 13 by means of a damping extension 18 arranged to move in the field of said damping magnet.

The indicating armature is provided with an index or pointer, consisting of arms 19 carried by the pivots 15 and 16 and joined by a cross arm or marker 20, which moves over a suitably graduated scale 21.

The operation of the device is as follows: The magnetic field produced by the coils 3 and 4 causes a rotation of the disk armature 7 and in the same manner causes the indicating armature 14 to move in the same direction as the disk armature. The movement of the indicating armature 14 about the pivots 15 and 16 is resisted by the spring 17 so that eventually the indicating armature assumes a position representing a balance between the force exerted by the coils 3 and 4 and the opposing force exerted by the spring 17. This position is dependent solely on the action of the coils 3 and 4 and the strength of the spring 17, and is not influenced in any way by the speed of rotation of the disk 7 or by the presence or absence of the disk. A change in the field produced by the coils 3 and 4 causes a corresponding change in the position of the indicating armature 14 whereby a continuous indication is obtained of the instantaneous values of the quantities measured by the meter. Even though the disk armature 7 should be stopped by friction or derangement of the recording mechanism, the indicating armature 14 would still be free to move and would give a correct indication of the amount of energy flowing through the meter.

My invention may be embodied in many other forms than that shown and described, and I therefore do not wish to be restricted to the precise form shown but intend to cover by the appended claims all changes and modifications within the spirit and scope of my invention.

What I claim as new and desire to secure by Letters Patent of the United States, is,—

1. In a measuring instrument, the combination with a meter comprising field coils and a rotatable armature, of a member movable in response to variations in the field of said coils, a control spring connected to said member to render its movement proportional to said variations, and a pointer actuated by said member to indicate the energy passing through the instrument.

2. In a measuring instrument, the combination with a meter comprising field coils and a rotatable armature, of an indicating armature pivotally mounted in the field of said coils, a control spring connected to said armature to render its movement proportional to the strength of said field, and a pointer carried by said armature.

3. In a measuring instrument, the combination with a meter comprising field coils nation with a meter compris fielding coils and and a rotatable armature mounted between said coils, of a pivoted indicating armature extending between the rotatable armature and one of said coils and movable in response to changes in the field, a control spring for rendering the movement of said indicating armature proportional to the energy passing through said instrument, and a pointer carried by said armature.

4. In a measuring instrument, the combination with a motor meter comprising field coils, a rotatable armature and a damping magnet for said armature, of a pivoted indicating armature mounted in the field of said coils and of said magnet to move in response to changes in the field of said coils, a control spring for rendering the movement of said indicating armature proportional to said changes, and a pointer carried by said armature.

5. In a measuring instrument, the combination with a motor meter comprising current and potential coils, a disk armature for said coils, and a damping magnet for said armature, of a pivoted sheet metal indicating armature mounted in the field of said coils and of said magnet, and a pointer carried by said indicating armature to indicate the energy flowing through said coils.

6. In a measuring instrument, the combination with a motor meter comprising field coils, a rotatable disk armature, and a damping magnet for said armature diametrically opposite the field coils, of a sheet metal indicating armature balanced on pivots adjacent the shaft of the disk with one part extending between the disk and the coils and the opposite part between the disk and the damping magnet, a control spring for rendering the movement of said indicating
5 armature proportional to the energy passing through said instrument, and a pointer carried by said armature.

In witness whereof, I have hereunto set my hand this 13th day of September, 1907.

WILLIAM F. HOWE.

Witnesses:
BENJAMIN B. HULL,
MARGARET E. WOOLLEY